United States Patent Office 3,438,173
Patented Apr. 15, 1969

3,438,173
METHOD FOR AUTOMATICALLY PACKAGING
SOLID ARTICLES AND APPARATUS THEREFOR
Shozo Omori, No. 44 Shimo Negishi-cho, Taito-ku,
Tokyo, Japan
Filed Mar. 11, 1966, Ser. No. 533,583
Claims priority, application Japan, Mar. 17, 1965,
40/15,275, 40/15,276, 40/15,277, 40/15,278;
Apr. 2, 1965, 40/18,928
Int. Cl. B65b 7/00, 51/10
U.S. Cl. 53—39                                 2 Claims

ABSTRACT OF THE DISCLOSURE

A method and appartus for sealing continuous cylindrical film between articles which are spaced at intervals along the film. Heat sealing members are moved against the portions of the film between the spaced articles and are moved along the path of the film at the speed of the film until the completion of the heat sealing operation. They are then moved in opposite directions away from the film and along semi-circular paths back to the point from which they started.

---

Figure 1:
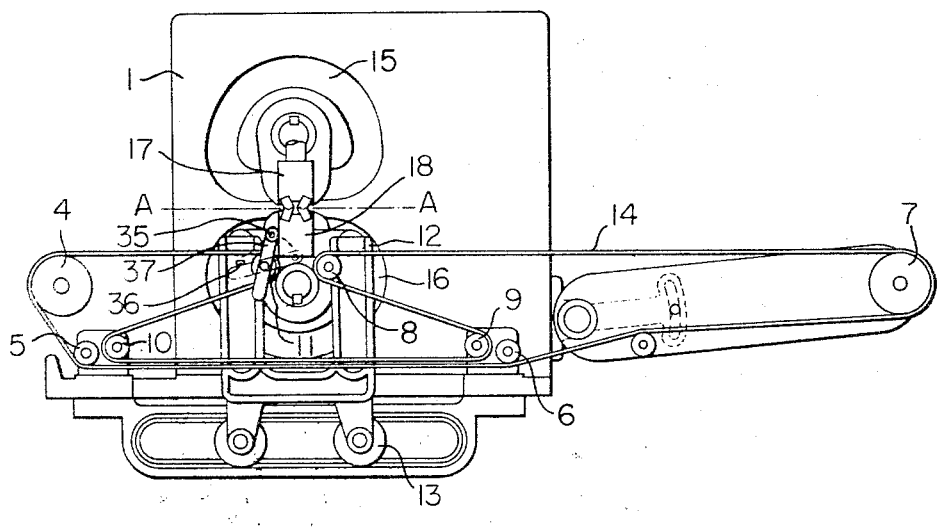

The present invention relates to a novel and useful method and apparatus for automatically packaging solid articles such as foods within the desired length of a cylindrical film such as thin plastic film by heat sealing and severing the continuous film between positions where the solid article or articles are contained in the film at predetermined intervals.

In the method for packaging of the prior art, a pair of heating rollers has been employed, which are substantially in contact with each other and oppositely rotated, the portion of the film to be heat sealed being inserted between the nip of said rollers, thereby melting the portion so as to be adhered. The cutter provided on a part of the periphery of one of the rollers (usually the upper roller) is used for severing the adhered portion. However, in such prior art, a substantial width with many pleats must be formed on the adhered portion of the film, resulting in a bad appearance and waste of the material. In order to overcome the above disadvantages, a heating edge has also been employed in the prior art for melting and adhering the film. However, for effecting the melting and adhering of the film by means of a heating edge, it must be pressed against the film for a predetermined time interval, thereby necessitating considerable lowering of the rotating speed of the rollers, resulting in decreasing the efficiency of the production. Also, a pair of endless belts has been employed in the prior art each provided thereon with a plurality of heating edges at predetermined intervals, between which belts the film is inserted .

All of the prior art systems have disadvantages in that the size of the products is limited and the machine for producing such packages must necessarily be made large.

Therefore, the primary object of the present invention is to provide a novel and useful method for successively producing packages of solid articles such as foods contained in a cylindrical film with both ends thereof heat sealed and severed to make individual packages, which method avoids the disadvantages of the prior art described above.

Another object of the present invention is to provide a novel and useful apparatus for producing packages described above, which apparatus avoids the disadvantages of the prior art.

Another object of the present invention is to provide a novel and useful heating and severing device for use in the automatic machine for producing packages described above, by which device the film is clamped and heated for a predetermined time interval, the device being moved together with the continuously fed film in synchronism therewith, thereby effecting heat sealing, thereafter the film being severed at heat sealed portion so as to form individual packages.

A further object of the present invention is to provide a novel and useful apparatus for automatically packaging solid articles within the cylindrical film with both ends thereof heat sealed and severed at the heat sealed portion so as to make individual packages, wherein auxiliary means is provided for preventing the package from gravitating out of the path of travel of the packages after the severing is effected.

The method for producing packages of my invention is characterized by the steps of feeding the cylindrical film with the solid articles to be packaged such as foods inserted therewithin at predetermined intervals, clamping the film from the upper and lower sides thereof at a position where the heat sealing and severing of the film is effected, the position of said clamping of the film being kept fixed relative to the film with the position being moved in synchronism with the feeding speed of the film, thereby heating the film for a predetermined time interval by said clamping action so as to effect the heat sealing and severing of the film at the heat sealed portions.

The apparatus for producing packages of my invention is characterized by the combination of feeding means for feeding cylindical film such as plastic thin film with the solid article or articles, such as foods, to be packaged located therein at predetermined intervals and heating means for effecting heat sealing and severing of the film at a position where heat sealing and severing is to be effected on the film, said heating means comprising an upper member and a lower member adapted to be moved upwardly and downwardly and horizontally in symmetrical relationship to each other with respect to the horizontal, both said member being adapted to clamp the film therebetween when they approach toward each other and being shifted together with the film in the direction of feeding of the film for a predetermined time interval while they are clamping the film, thereby heat sealing and severing the film, both said members being released from the film after severing is effected and returned to the position where a succeeding clamping and heat sealing of the film are commenced.

Auxiliary means is provided in my invention for preventing the heat sealed package from being gravitated out of the path of travel, wherein roller means is moved to a position for guiding the package in the path of travel while same is to be fed, said roller means being moved out of said position when heat sealing of the film is to be effected by heating means so as to avoid the interference of the roller means with heating means.

Figure 2:
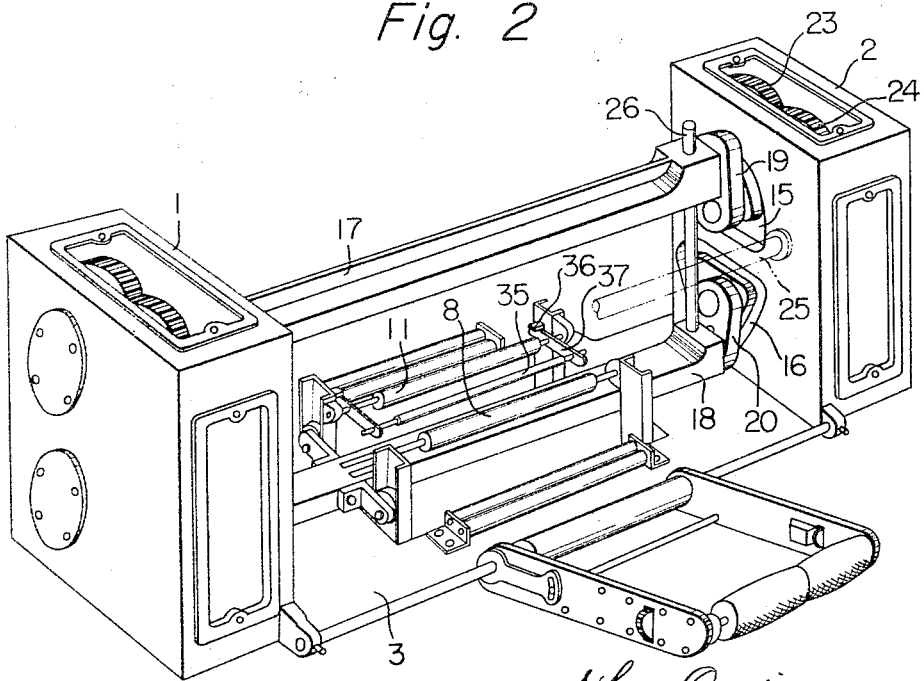
Figure 3:
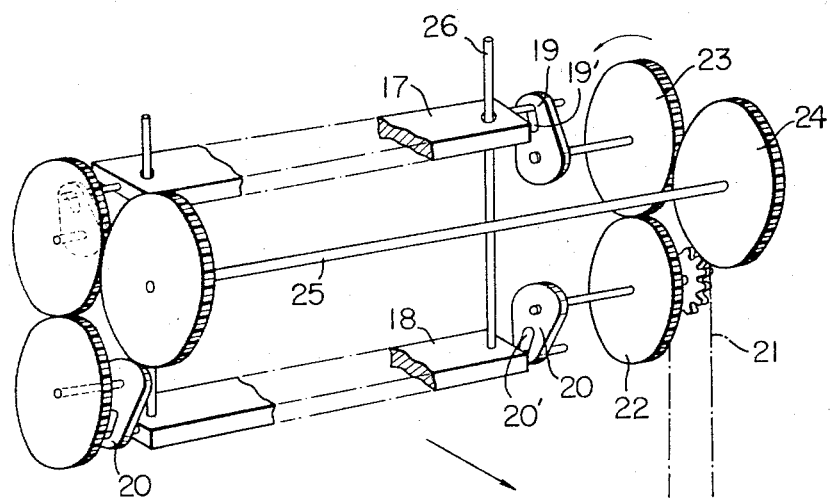
Figure 4:
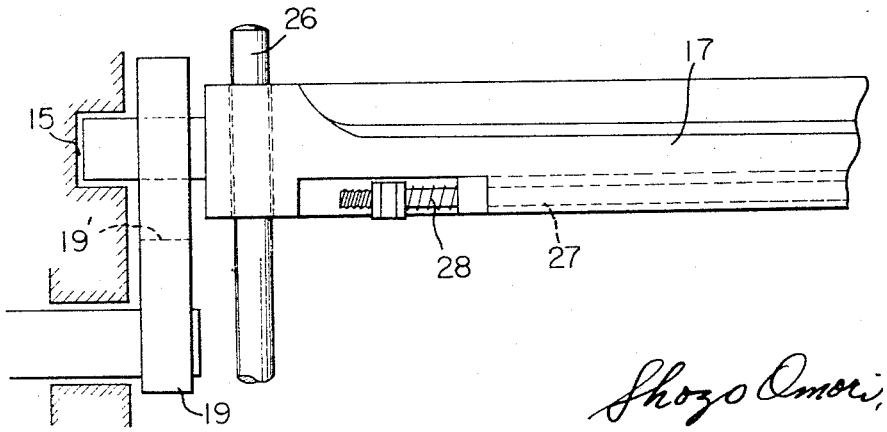
Figure 5:
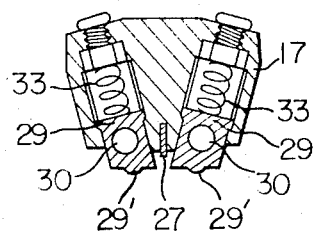
Figure 6:
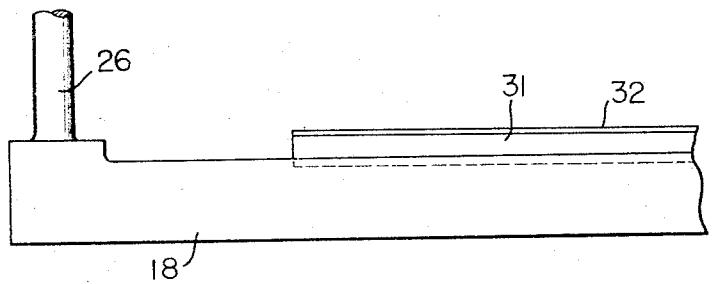
Figure 7:
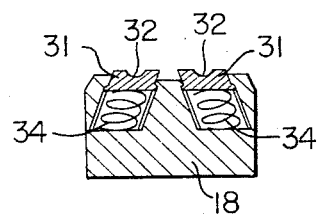

The subject matter which is regarded as my invention is particularly pointed out and distinctly claimed in a concluding portion of this specification. The invention, however, as to its organization and operation, together with further objects and advantages thereof, will best be understood by reference to the following description taken in connection with the accompanying drawing, in which:

FIG. 1 is a diagrammatic side view showing the preferred embodiment of the invention, FIG. 2 is a schematic perspective view showing the embodiment as seen from the output side thereof, FIG. 3 is a schematic perspective view showing the driving connection of the embodiment, FIGS. 4 and 5 show the upper member of heating means, in partial side elevation and cross-section, respectively; and FIGS. 6 and 7 show the lower member of the heating means, in partial side elevation and cross-section, respectively.

Referring now to FIG. 2, a pair of box-like housings 1 and 2 are shown at the left and right sides of the machine in symmetrical relationship to the center line of the machine, which housings are connected to a bed plate 3 at their lower ends, respectively. As shown in FIG. 1, guide rollers 4, 5, 6, 9, 10 are rotatably journaled on bed plate 3. A suitable drive means may drive any one of said rollers. A cutout area is provided in the center portion of bed plate 3, through which a pair of upstanding guide frames 12 project on the left and right sides of said cut-out portion in symmetrical relationship, said frames 12 being shiftably supported by rollers 13 attached to their lower ends in a pair of fixed guide ways, respectively, so that they can be shifted forwardly and rearwardly in said cut-out area. Guide roller 8 and guide roller 11 are journaled between corresponding arms of said left and right guide frames 12, respectively as shown. An endless belt 14 is stretched around rollers 4, 5, 6, 7, 8, 9, 10, so that a space is provided between rollers 8 and 11, said space being utilized for passing heating means to be described hereinafter therethrough in reciprocal manner. It is evident that frames 12 carrying rollers 8, 12 can be reciprocally shifted without affecting the tension of belt 14, thereby affording free movement of the space upon shifting of frames 12. Belt 14 is moved around said rollers by said driving means at a speed which corresponds to that of transporting means in a machine (not shown) for inserting solid articles such as foods within the cylindrical film, said transporting means being located in front of roller 4, said film being transported from the left in the drawing toward belt 14 on roller 4 and fed rightwardly on the upper stretch of belt 14. Finished packages are fed out from belt 14 on roller 7. In each of the opposed faces of box-like housings 1 and 2 are provided upper and lower guide slots 15, 16 substantially in the form of semicircles in symmetrical relationship with respect to the horizontal. Upper member 17 forming a part of a heating means has shafts extending axially from its two ends, which slidably fit within upper slots 15 of each of housings 1 and 2, respectively. Lower member 18 also forming a part of the heating means has shafts extending axially from its two ends, which slidably fit within lower slots 16 of each of housings 1 and 2, respectively. A pair of upstanding rods 26 are fixedly secured to said lower member 18 at its ends and a pair of holes provided in said upper member 17 at its ends slidably receive said rods, respectively so that upper and lower members 17, 18 are moved together with upper member 17 being maintained in a vertically upward position with respect to lower member 18. As shown in FIGS. 2 and 3, a pair of crank arms 19, 20 are provided on each of the inner opposing faces of housings 1, 2. Each of said crank arms 19, 20 has an elongated slot 19', 20' adjacent its outer end. The elongated slot 19' of said crank arm 19 slidably receives the shaft extending from the end of upper member 17 between the end of the member and the housing. The elongated slot 20' of said crank arm 20 also slidably receives the shaft extending from the end of lower member 18 between the end of the member and the housing. As shown in FIG. 3, crank arm 20 is driven by suitable driving means through a chain wheel and chain 21. Gear 22 secured on the shaft of crank arm 20 meshes with gear 23 secured on the shaft of crank arm 19 and is the same size as gear 22, so that crank arm 19 is rotated in the opposite direction with respect to crank arm 20 at the same speed as crank arm 20. Another gear 24 meshes with gear 23. Gears 22, 23 and 24 are housed in housing 1. The rotation of gear 24 is transmitted to a gear in the opposite housing 2 through a shaft 25 secured to this gear and said gear 24. Gearing means similar to that comprised of gears 22, 23, 24 drives crank arms 19, 20 of crank arms 19, 20 on the opposite side of the machine. Since the shafts of upper member 17 fit within slots 15 in each of the opposed faces of housings 1 and 2, respectively, and are driven by crank arms 19 on opposite sides of upper member 17, and the shafts of lower member 18 fit within slots 16 in each of the opposed faces of housings 1 and 2, respectively, and are driven by crank arms 20 on opposite sides of lower member 18, and the elongated slots 19', 20' of crank arms 19, 20 allow slidable engagement of the shafts of members with said slots, it is evident that upper and lower members 17, 18 are moved symmetrically with respect to horizontal line A—A in the paths determined by slots 15, 16, respectively, with upper member 17 being kept in a vertically upward position relative to lower member 18 by virtue of rods 26 upstanding from lower member 17 slidably engaging in holes in upper member 17. The movement of upper and lower members 17, 18 is such that they move first horizontally and then upper member 17 moves upwardly and backwardly in the path of the semicircle defined by the arcuate portion of slot 15, while lower member 18 moves downwardly and backwardly in the arcuate path defined by the arcuate portion of slot 16.

In operating the machine, the movement of upper and lower members 17, 18 is synchronized with the reciprocal shifting movement of frames 12, so that member 18 can freely move into the space between rollers 8 and 11 when member 18 is moving in the semicircular path in slot 16, upper and lower members 17 and 18 being moved at the same speed as that of frames 12 when members 17 and 18 are advanced in the horizontal paths in slots 15 and 16 and are kept in abutting relationship against each other.

As shown in FIGS. 4 and 5, upper member 17 is provided with a heating plate 27 embedded therein longitudinally along the lower face thereof which is heated by Nichrome wires also embedded in member 17 and energized by an electric source (not shown). The elongation of heating plate 27 with respect to member 17 by heat is compensated for by coil spring 28. A pair of sealing heads 29 are provided in guide ways on opposite sides of said heating plate 27 so as to be shiftable in said guideways, said sealing heads 29 being biased outwardly by means of coil springs 33, and said guide ways being inclined toward each other so that the outer ends of of the sealing heads approach each other as they are moved outwardly. Projections on the inner ends of sealing heads 29 prevent the members from being sprung out of upper member 17 by virtue of shoulder portions provided the guide ways for sealing heads 29. Holes 30 may be provided in sealing heads 29 for admitting cooling water therethrough. Clamping projectiles 29' are formed longitudinally along the outer ends of sealing heads 29, respectively.

As shown in FIGS. 6 and 7, a pair of sealing heads 31 are provided in guide ways opening out of the upper surface of lower member 18. In a similar manner to the sealing heads 29 in upper member 17, sealing heads 31 are biased outwardly by means of coil springs 34 and approach each other as they are shifted outwardly. Projections at the inner ends of sealing heads 31 prevent the heads from being sprung out of lower member 18 by virtue of shoulder portions provided in guide ways for sealing heads 31. Grooves 32 for receiving clamping projections 29', respectively, are provided longitudinally along the outer surfaces of said sealing heads 31. The location of said sealing heads 29 and 30 is such that, as upper and lower heads 17 and 18 approach each other, clamping projections 29' of sealing heads 29 first engage with grooves 32 on sealing heads 31, respectively, and, upon further approach of members 17 and 18 to each other, sealing heads 29 and 31 are forced back into their respective guide ways against the action of springs 33 and 34, respectively, thereby maintaining engagement of clamping projections 29' with grooves 32, so that the distance between two clamping projections 29' is made slightly greater by virtue of the inclination of guide ways for sealing heads 29 and 31 as described previously.

In operation, cylindrical film such as thin plastic film containing therewithin solid articles such as foods located at predetermined intervals is fed from the left side as viewed in FIG. 1 on belt 14 from a machine for inserting articles into the film as described previously. The film is advanced rightwardly as viewed in FIG. 1 on belt 14. Frames 12, hence the space defined between rollers 8 and 11, and upper and lower members 17 and 18 are located at left side of slots 15 and 16 at the beginning of operation. When the portion of the film to be heat sealed and severed, which portion lies between the articles located at intervals within the film, comes to the position between upper and lower members 17 and 18, hence within the space defined by rollers 8 and 11, upper and lower members 17 and 18 are moved toward each other by the action of crank arms so as to first clamp the portion of the film to be heat sealed and severed by means of clamping projections 29' and grooves 32 and then press heating plate 27 against the surface of lower member 18 with the film being sandwiched therebetween. Frames 12, hence rollers 8 and 11, are moved to the right in FIG. 1 in synchronism with the movement of upper and lower members 17 and 18 in the horizontal paths of slots 15 and 16, respectively, with clamping projections 29' and heating plate 27 kept in abutting relationship with grooves 32 and the surface of lower member 18, respectively, for a predetermined time interval determined by the length of horizontal paths of slots 15 and 16 and the speed of the film feed. The film is molten and adhered by heating plate 27 thereby effecting heat sealing of the film, and, since two sealing heads 29 engaging with each of sealing heads 31 move apart from each other as they are forced back into respective members 17 and 18, the portion which is to be heat sealed is kept in a tensioned state thereby resulting in positive heat sealing with good appearance. Upper and lower members 17 and 18, after effecting heat sealing and severing of the film, are moved in semicircular paths of slots 15 and 16, respectively, so as to move apart from each other and return to the initial positions where the next heat sealing and severing operation is to be commenced, and, at the same time, frames 12 carrying rollers 8 and 11 are moved back to their initial position in synchronism with the movement of upper and lower members 17 and 18 in their respective semicircular paths of slots 15 and 16. During the movement of upper and lower members 17 and 18 in their semicircular paths of slots 15 and 16, the film containing said articles can be advanced on belt 14, because both members 17 and 18 move apart and provide space sufficient for transporting the film containing the solid article through said space.

As previously described, a space is formed between rollers 8 and 11 for permitting the movement of lower member 18 therethrough. There might occur a danger of gravitating the film containing solid articles out of the path on belt 14 when it is advanced over the space between rollers 8, 11 after the heat sealing and severing of the film is effected and when lower member 18 is being moved in the semicircular path of slot 16. To prevent the film containing solid article from gravitating out of the path of travel on belt 14, receiving roller 35 of smaller diameter may be swingably provided between rollers 8 and 11 at a position at substantially the same level as rollers 8 and 11 as shown in FIGS. 1 and 2. The ends of said receiving roller 35 are journaled in the outer ends of a pair of supporting levers 37, which are swingably mounted on the ends of roller 11. The other end of each of supporting levers 37 extends in the opposite direction to the end which supports roller 35. Levers 37 have a tendency to swing clockwise due to the weight of roller 35. Stop 36 is provided on each of frames 12 as shown in the drawings, said stop limiting the swinging movement of lever 37, thereby maintaining roller 35 at the position substantially at the same level with rollers 8 and 11. When lower member 18 is moved upwardly, roller 35 contacts the side of lower member 18 and levers 37 are swung counterclockwise following the upward movement of lower member 18 as shown in the drawings. It is evident that, when lower member 18 is moved downwardly for passing the film containing solid articles on belt 14, roller 35 is positioned at the level of rollers 8 and 11 thereby assuring the safe transportation of the article, and, when lower member 18 is moved upwardly for the next heat sealing operation, roller 35 will be swung out of the path of travel of lower member 18 thereby avoiding the interference between lower member 18 and roller 35.

As described above, heating plate 27 is moved in synchronism with the film which is continuously fed for a predetermined time interval while heating plate 27 presses against the face of lower member 18 with the film sandwiched therebetween. High quality of heat sealing and severing action is assured, and a beautiful appearance of packages is obtained by the provision of sealing heads 29 and 31 which effect tensioning action on the portion of the film where heat sealing is effected during the abutting of heating plate 27 against the face of lower member 18 with the film sandwiched therebetween. My invention further assures safe and steady transportion of packages by the provision of roller 35 which is kept in position during the transportation of the packages.

What is claimed is:

1. In a method for successively producing packages, wherein solid articles are inserted into a continuous cylindrical film and portions of the film between the articles are successively heat sealed and severed, comprising the steps of feeding the cylindrical film with the solid articles to be packaged inserted therewithin at predetermined intervals, clamping the film from the upper and lower sides thereof at a position between the articles where heat sealing and severing of the film are to be effected, the position of said clamping being kept fixed relative to the film while the film is advanced, heating the film for a predetermined time interval during said clamping action, thereby effecting heat sealing and severing of the film, the improvement consisting in moving an upper and a lower heat sealing and severing means in parallel linear paths on opposite sides of the film path and at the speed of the film while applying heat and severing the film, and then returning the sealing and severing means along symmetrically opposed semi-circular paths so that said means contact each other and move horizontally along with the film being advanced on said linear path, each of said means moving away from the film and remaining apart from the other means during the period of time from the completion of a heat sealing cycle to the starting of the next sealing cycle as said means travel on said semi-circular paths, thereby ensuring a more positive sealing effect.

2. Apparatus for heat sealing and severing a film in the form of a continuous tube of film material with heat sealed overlapping edges in a continuous seam and filled with solid material at predetermined intervals, said apparatus comprising a horizontal upper member having a heating plate therealong, a horizontal lower member disposed below and in parallel with said upper member, an apparatus end member having straight parallel horizontal guide slots therein and an upper semi-circular guide slot connecting the ends of the upper horizontal slot and a lower semi-circular guide slot connecting the ends of the lower horizontal slot, said upper and lower members being engaged in the respective guide slots and crank arms having longitudinal holes engaged by said upper and lower members, respectively, and drive means driving said crank arms for moving said upper and lower members transversely of the length thereof in a semi-circular path and a horizontal straight path, whereby the continuous tube of film material can be fed between said upper and lower straight paths and the upper and lower members moved together to clamp said film and apply heat thereto as the film moves, and the upper and lower members can be moved quickly away from the film in opposite directions and returned to the start of the horizontal straight paths at the end of the heating step.

References Cited

UNITED STATES PATENTS

| 3,020,687 | 2/1962 | Zoa | 53—28 X |
| 3,237,371 | 3/1966 | Gerlach | 53—182 |

THERON E. CONDON, *Primary Examiner.*

E. F. DESMOND, *Assistant Examiner.*

U.S. Cl. X.R.

53—182, 373